Patented Nov. 27, 1928.

1,693,575

UNITED STATES PATENT OFFICE.

ERNEST M. BROGDEN, OF SANTA MONICA, AND MILES L. TROWBRIDGE, OF PALMS, CALIFORNIA, ASSIGNORS TO BROGDEX COMPANY, OF WINTER HAVEN, FLORIDA, A CORPORATION OF FLORIDA.

PREPARATION OF FRESH FRUIT FOR MARKET.

No Drawing.    Application filed December 2, 1925. Serial No. 72,808.

This invention relates to preparation of fresh fruit for market; and it relates more particularly to protective treatment of fresh fruit, in the course of preparing it for shipment to market, whereby decay commonly caused by rot-producing organisms of various kinds is largely or wholly prevented and the attendant losses reduced or eliminated.

The invention is of general application in the commercial handling and preparation of fruit that is to be distributed to consumers in fresh or uncooked condition, such as citrus fruit, apples, peaches, etc., for example. Moreover, in the broader aspects of the invention, the term fruit as herein employed is to be understood as including also such fresh vegetables as can be treated with benefit in accordance with the procedure to be hereinafter described. The invention can be employed to greatest advantage at present, however, in the treatment of citrus fruit, such as oranges, lemons, tangerines, grapefruit, and the like, and accordingly reference will be made hereinafter more particularly to the treatment of citrus fruit as affording a concrete example by means of which the principles of the invention may be fully disclosed and explained.

Fresh fruits, especially citrus fruits, are subject in greater or less degree to attack by various kinds of rot or decay organisms which tend to develop and damage the fruit during the period between the time it is gathered and the time it reaches the consumer. Among these the most destructive are the blue and green molds of which several varieties are known but which are commonly designated in the industry, and also herein, by the generic term "blue mold." Fruit of which the rind tissues have been exposed through mechanical injury of any kind, however slight, is susceptible to attack by blue mold spores. Stem-end rot is another rot-organism sometimes causing much damage to citrus fruit. These are typical of various forms of decay or rot against which treatment of fruit in accordance with the principles of the invention affords protection.

For many years no effective means of controlling so-called blue mold rot or decay was available to the industry although the problem had been the subject of extensive research and investigations by experts in fruit handling. Recently, however, it has been found (Brogden and Trowbridge Patent No. 1,529,461) that suitable treatment of the fresh fruit with a solution of ordinary borax of sufficient concentration is effective to eliminate or at least greatly reduce the losses from blue mold decay that had previously been considered practically unavoidable. This treatment with borax has now gone into use on a large scale for treating citrus fruit and has proved of great benefit to the industry. In its more specific aspects, the present invention relates to certain developments of and improvements upon the borax treatment before mentioned, but in its broader aspects the new process is not necessarily restricted to the use of borax or other alkaline borate as the specific mold-retarding or inhibiting agent.

In practicing the process commercially it has usually been found advisable, in order to ensure attainment of best results, to employ a treating solution containing at least about 5 or 6 ounces of the mold-retarding agent, specifically borax, per gallon of water in making up the solution. The mold-inhibiting action of such a solution on oranges, for example, is excellent when the treatment is carried out under proper conditions. However, when a solution of this or higher concentration is applied to fruit and the fruit is allowed to dry, the solid mold-retarding agent left on the surface of the fruit is noticeable, and for this reason ready salability of the fruit in certain markets is to some extent adversely affected notwithstanding the fact that the edibility of the fruit is in no wise impaired thereby. This is due to the fact that consumers of fruit are accustomed to select fruit in market very largely by its external appearance which thus becomes one of the important factors in the marketability of the fruit. This fact is pointed out in the aforesaid patent to Brogden and Trowbridge and a method of avoiding the difficulty by dry-brushing the fruit to remove the excess of solid borax from the surface of the fruit is described therein. This method is effective to remove objectionable visible excess of borax without danger of removing so much as materially to affect the resistance of the fruit to blue mold rot. However, it renders necessary an additional step in the handling of the fruit in the packing house; and furthermore it is found that, although this dry-brushing is capable of being so carried out as to remove substantially all visible traces of excess borax from the skin of the fruit, nevertheless the quantity remaining is sometimes sufficient, if the fruit is thereafter further treated by the application of a waxy protective coating, to form with the waxy protective material a mixture that is apt to give the surface of the fruit in places a more or less grayish tint or cast which is detrimental to its appearance and thus may in some cases prevent its bringing the best price. Removal of excess borax by lightly rinsing the fruit with plain water after treatment with the solution and before the fruit is dried off has also been resorted to, and under properly regulated and controlled conditions has proved to be a safe and practical method. However, where the rinsing step is employed, it is usually advisable to employ the treating solution in concentrations as high as 8 to 10 or 12 ounces of borax per gallon and to make sure that the fruit remains wet with the solution for a substantial period of time, say 5 to 8 minutes, sufficient to effect such a thorough penetration of the strong solution into exposed surface tissues of the fruit that the subsequent rinsing with fresh water will not operate to materially reduce the efficiency of the inhibiting treatment.

Where the treating solution contains as little as 2 to 3 ounces of borax or thereabouts, the fruit to which it is applied, when allowed to dry, shows no objectionable deposit or residue of the solid mold-retarding agent, nor is a grayish cast given the skin of the fruit by application of waxy protective material thereto, but the mold-inhibiting action of solutions of such lower concentrations, although pronounced, is appreciably less efficient and dependable, other conditions of treatment remaining the same. Hence it has been considered best practice, in using the borax treatment, to employ stronger treating solutions and, where market conditions require, to remove unnecessary excess of the treating reagent from the surface of the fruit either by dry-brushing or by carefully regulated rinsing as above described.

It is a principal object of the present invention to provide a process of treating fresh fruit for protection against blue-mold and other forms of decay or rot susceptible of successful treatment by the general method above described, whereby all the advantages that have been realized by treatment with borax solutions heretofore may be realized while at the same time the stated difficulties may be avoided and certain further advantages may be attained. With this and other objects in view, as will more fully appear hereinafter, the invention consists in the procedure which will be hereinafter described in connection with certain specific examples illustrating the broad principles involved and which will then be more particularly pointed out in the appended claims.

The present invention is based primarily upon the discovery that by the use of certain auxiliary substances or reagents in conjunction with a mold-retarding agent employed in proper concentration and under proper conditions, the protective or inhibiting efficiency of said mold-retarding agent may be materially enhanced, thus making it possible to obtain thoroughly satisfactory results by the use of substantially weaker or less concentrated treating solutions than it has been found advisable to employ heretofore for this purpose in commercial practice.

More particularly, it has been found that by using soap in conjunction with the mold-retarding agent, this increase in protective efficiency may be attained in marked degree. Certain other substances may also be employed, either instead of or in addition to soap for this purpose, as will hereinafter more fully appear, but soap is at present deemed to be most satisfactory and effective in its action.

While the invention rests upon observed facts and is not dependent upon any particular theory of operation, it is believed that the soap or similarly acting substance employed in conjunction with the mold-retarding agents acts upon the spores of the mold or rot in such manner as to render the spores more easily accessible to or permeable by the mold-retarding agent. It is a well known fact that developed mold or rot organisms are more susceptible to the destructive action of a mold-retarding agent than are the spores (if any) produced by such organisms. For example, the spores of so-called blue mold are very much more resistant and difficult to kill or render inactive than the parent mold, this greater resistance being generally considered to be due to the provision of an oily protective coating or envelope around the spore which renders it water-repellent. The effectiveness of the process of the present invention is therefore probably due, at least in part, to what may be termed a solvent or permeabilizing action of the soap or other auxiliary agent upon the water-repellent protective coating of the spore, whereby the mold retarding agent is afforded access to the spore and is able to permeate or impregnate it to such an extent as either to kill it or render it incapable of development.

The employment of an auxiliary treating agent, such as soap, in accordance with the principles of this invention may be effected in various specific ways; that is to say, it may precede application of the mold-retarding agent proper to the fruit, or it may occur simultaneously therewith. The important point is that whether the conjoint action of the said agents be attained by successive or simultaneous application thereof to the fruit, opportunity is afforded the soap or other auxiliary agent to act upon the fruit in such manner as to increase the permeability of the blue mold or other decay organisms and spores by the mold-retarding agent. Generally speaking, the soap or other auxiliary agent should most advantageously be allowed to act upon the fruit either in advance of or simultaneously with the application of the principal mold-retarding agent, such as borax. In the practice of the invention it has been found most desirable, both upon the ground of convenience and also upon the ground of best efficiency in inhibiting or protective effect, to employ the principal mold-retarding agent and the auxiliary agent simultaneously in mixed solution, and this procedure is therefore at present deemed most desirable.

By way of further explaining the principles of the invention, a typical example illustrating how the new process may be satisfactorily employed in practice for protecting oranges against blue mold rot will now be described in detail. The fruit as delivered to the packing house by the growers may first be washed in the customary manner. This commonly involves dumping the fruit into a soaking tank containing water, from which tank the fruit is carried by a suitable elevator device to a fruit washer which is ordinarily of the rotary cylindrical brush roll type. On the washer, the fruit is thoroughly rubbed or scrubbed by the rotating brush rolls and is sprayed with water from overhead spray devices. From the washer, the fruit passes to another tank containing a water solution of borax and soap, the solution being most desirably maintained at a temperature above atmospheric. For best results, the temperature should be above 100° F. and temperatures ranging from 110° to 115° F. or thereabouts are particularly effective. Care should be taken, however, that the temperature of the treating solution is not sufficiently high to scald, cook, or otherwise injure the fruit. The strength of the solution, both as regards its content of borax and also of soap, may vary considerably, but in general the solution should most desirably contain at least one ounce of borax and one-eighth of an ounce of good soap per gallon. Better results are obtained if the solution contains at least two ounces of borax and one-fourth ounce of soap per gallon. As much as three ounces of borax per gallon can be used under these conditions without producing an objectionably noticeable deposit of solid treating reagent on the surface of the fruit after it is dry, and the inhibiting action obtained is thoroughly satisfactory and dependable. Where desired, still larger amounts of borax can be used, but ordinarily it is quite unnecessary to employ more than four or five ounces of borax per gallon at the most when employed in conjunction with soap in accordance with the principles of the invention. Larger quantities, even up to the saturation point of the solution at the temperature of operation, do no harm although such high concentrations may introduce complications in the mechanical handling of the fruit. However, the presence of the soap appears to reduce the crystallizing tendencies of the borax and to enable the employment of stronger concentrations, without leaving an objectionable excess deposit on the surface of the fruit, than is feasible where soap or a similar acting auxiliary agent is not used in conjunction with the borax. By increasing the concentration of soap in the treating solution, the concentration of borax may also be increased somewhat without encountering difficulty from unsightly excess solid deposit on the fruit after its surface has dried off. It is seldom necessary to use more than one ounce of soap per gallon of solution, and usually less suffices. In practice, a good working rule is to use from two to four ounces of borax and from one-fourth to one-half ounce of soap per gallon of water in making up the mixed treating solution, three ounces of borax and one-fourth ounce of soap per gallon being at present considered an optimum proportioning of the reagents.

The fruit should most desirably remain in the warm treating solution for at least about two minutes to ensure intimate contact of the treating solution with the entire exterior surface of the fruit so that all pores and crevices, and especially all surface tissues exposed as a result of cuts, scratches, bruises, and the like, may be thoroughly impregnated and wetted with enough of the solution of mold-inhibiting agent or agents to render the fruit properly resistant to blue mold or other forms of rot or decay that are amenable to this kind of treatment. As a rule it is unnecessary to keep the fruit wet with the treating solution for more than 8 to 10 minutes as a maximum before transferring it from the treating tank to the drier hereinafter referred to, and usually 5 to 6 minutes, or sometimes even less, is enough.

In order to ensure thorough contacting of the treating solution with the entire surface of the fruit, it is sometimes desirable to provide means for maintaining the fruit wholly submerged below the surface of the treating solution for at least a substantial part of the time that the fruit remains therein. There are various ways of accomplishing this in practice. One way is to accumulate a rather large body or mass of fruit in the treating tank and then to so correlate the rate at which the fruit is fed into one end of the tank with the rate at which it is removed from the other end as always to maintain in the tank a body of fruit several layers deep; and then by suitable agitating means, such as jets of air or treating solution, to cause the fruit in the several layers to exchange places several times during the progress of the fruit through the tank. Another way is to provide mechanical conveyor means operating to carry the fruit down under the surface of the solution upon its entering the tank and to hold it submerged during its travel through the tank until it reaches the discharge end where an elevator transfers it from the treating tank to the drier. Such expedients are not essential to the practice of the invention in its broader aspects, however.

From the treating tank, the fruit is transferred by suitable elevator and conveyor means to a drier which may be of any well known or suitable type. Here the fruit is subjected to gentle drying conditions to remove surface moisture. The fruit coming from the drier, although carrying no objectionable excess of solid borax on its surface if the treating solution was employed in the lower concentrations above recommended, does nevertheless carry borax upon its rind and in and upon exposed surface tissues in such quantity as to render the fruit highly resistant and substantially immune to blue mold rot. The fruit may now be graded and sized, packed in boxes and shipped to market without further treatment. Where desirable, however, it may be moderately rubbed or polished on a fruit polisher immediately after leaving the drier, and in such cases it is found that the small amount of soap present on the skin of the fruit enables an especially good polish to be obtained.

Where it is desired not only to treat the fruit as described for prevention of blue mold decay, but also to provide it with a preservative coating to prevent undue shrinking or withering and to maintain the fruit plump and firm throughout the shipping and distributing period, the fruit after leaving the drier may receive an application of a small quantity of a waxy coating material, such as paraffin, dissolved in or mixed with a refined light mineral oil, and this coating material may be spread by the action of rapidly rotating polisher brushes or the like all over the surface of the fruit in an extremely thin film hardly discernible by the eye. This extremely thin film coating, although serving to reduce shrinkage and withering to a minimum, is not of such character as to stop the breathing or transpiration of the fruit which would be highly undesirable.

While in the detailed procedure specifically described hereinabove the fruit is subjected to a preliminary washing before being brought into contact with the solution of borax or other principal mold-retarding agent, it is feasible to contact such treating solution initially with the fruit before it has been wet with a preliminary washing solution. Such initial contacting of the treating solution with the fruit, as contrasted with a procedure in which fruit is first washed in ordinary wash water, for example, and is then brought into contact with the treating solution, has heretofore been the most effective way of treating fruit with borax solution, especially where it has been found necessary or advisable to rinse the fruit slightly with plain water to remove unnecessary excess of the treating reagent. The conjoint use of the mold-retarding agent and an auxiliary solvent or penetrating agent in accordance with the present invention, however, renders it feasible to employ a preliminary washing step before the fruit is treated with the principal mold-retarding agent and still to obtain thoroughly satisfactory mold-inhibiting action. This is an advantage because under these circumstances the fruit may be thoroughly cleansed of foreign matter, such as dirt, soot, etc. before coming into contact with the main treating solution. The treating solution therefore requires changing very much less often and this fact, coupled with the fact that it is possible and even advisable to use solutions of relatively low concentration under the conditions hereinabove set forth, makes for substantial economies in commercial operation.

In referring herein to certain proportions of soap recommended for use in the present process, reference is made for the sake of definiteness to a hard white soap of good quality ordinarily containing in the neighborhood of 30 per cent of moisture, the remainder being substantially pure soap. Of course it is not essential that this particular grade of soap be used, this being mentioned merely in order to afford a definite standard for convenient reference and definition of recommended proportions. The soap may advantageously be used in flaked, granulated or powdered condition in making up the treating solution. Soap powders of various kinds may also be used, but since these usually consist of soap in mixture with sodium carbonate and other additions, allowance should be made for this fact.

It may also be noted that in recommending proportions hereinabove, it is intended that the amounts specified shall be actually contained in solution. Therefore, if hard water is used, allowance should be made for the reagents, including soap, that may be precipitated out by the hardness or otherwise rendered inactive for the purpose in view. Alternatively, hard water should be softened before being used.

While soap is especially effective for the purposes of the invention and is deemed the most efficient auxiliary agent to use in increasing the permeability of mold spores by the principal mold-retarding agent, it is nevertheless feasible to use other and more or less similarly acting reagents instead of soap or in addition thereto. For example, alkaline hydroxids, and especially caustic alkalies such as sodium hydroxid, can be used for this purpose, as well as other alkaline agents such as sodium carbonate, potassium carbonate, ammonium carbonate, ammonium hydroxid, etc. It is probable that the increase in mold-inhibiting efficiency that is realized by the use of such auxiliary agents as these may be due to a saponifying action upon the protective oily coating of the spores which renders them less water-repellant, much as soap appears to do by its solvent or sensitizing action on the more resistant rot-producing organisms, which action may be due in part to the fact that soap is hydrolyzed to some extent in water. It may also be noted here that each of the alkaline reagents just mentioned also has specific mold-inhibiting action in addition to possessing solvent or solubilizing action on the protective oily coating of mold spores, and each of them may be used alone in water solution under suitable conditions to treat fresh citrus and other fruits for protection against blue mold rot and other forms of decay. In the case of ammonium hydroxid, for example, this may be employed in the form of ordinary commercial aqua ammonia (28 per cent $NH_3$), using 5 per cent of this reagent by weight in water solution. Sodium carbonate may be employed in the form of soda ash, using from two to ten or twelve ounces per gallon of water, for example. Strongly caustic alkali, such as sodium hydroxid, should be used somewhat sparingly in order to avoid injuring the skin of the fruit, from one to two ounces per gallon being ordinarily sufficient to secure the results desired. The proportions just given for the use of these alkaline reagents alone may be somewhat reduced when they are employed as auxiliary penetrating or permeabilizing agents in conjunction with another mold-retarding agent such as borax and the like.

While it is considered that as a rule borax is most desirable to employ as the principal mold-retarding agent in carrying out the process of the invention, the invention is not restricted thereto. For example, boric acid, or mixtures of borax and boric acid in various proportions, may be used. Sodium hypochlorite applied in fairly strong concentration, say a 2 per cent solution or stronger, to the surface of fruit that has been first thoroughly treated with soapy water is effective to a substantial degree as a preventive of blue mold decay although its action is apt to be less permanent than and not as consistently reliable as that of borax. The action of the sodium hypochlorite can be improved by adding sodium carbonate (soda ash) to the solution containing it in the proportion of two ounces or more per gallon. Instead of applying the soap solution to the fruit before contacting it with the sodium hypochlorite solution, it is of course possible to use a mixed solution of sodium hypochlorite and soap, with or without the addition of sodium carbonate.

Sodium bisulfite may also be used as a mold-retarding agent in conjunction with an auxiliary penetrating or solvent agent in the general manner hereinabove described. When using soap as the auxiliary agent in this case it is best to employ it in a preliminary step preceding the treatment with bisulfite. The bisulfite may be employed in concentrations similar to those given above in the case of borax.

Where the mold-retarding agent and auxiliary or oil-solubilizing agent are both solids and substantially non-reactive toward each other in that form, and in cases where simultaneous application thereof to the fruit in a mixed solution is desirable, they may be intimately mixed in the proper proportions in finely divided condition, and the proper quantity of the mixture added to water to make up a treating solution of the required concentration. Where soap is used as the auxiliary agent it is best used in powdered form when mixed with borax or other mold-retarding agent, and usually it should constitute a minor proportion of the mixture. Such mixtures are believed to be novel in the art and they form a part of the present invention.

Although, in the foregoing detailed description, emphasis has been laid more particularly upon that important phase of the invention which permits dispensing with rinsing or other methods of removing undesirable visible excess of treating reagent from the surface of the fruit, while at the same time attaining satisfactory resistance of the treated fruit to blue mold and other forms of rot, it is not to be inferred that such methods are excluded from the practice of the invention.

What is claimed is:

1. In the preparation of fresh citrus fruit for market, the process of treating such fruit for protection against blue mold and other forms of decay, which comprises subjecting the entire surface of fresh citrus fruit to the conjoint action of soap and borax in aqueous solution and in concentration sufficient to exert a substatial inhibiting effect on blue mold.

2. In the preparation of fresh citrus fruit for market, the process of treating such fruit for protection against blue mold and other forms of decay, which comprises subjecting the entire surface of fresh citrus fruit to the conjoint action of soap and borax in aqueous solution, the soap being employed at a concentration of at least one-eighth ounce per gallon and the borax at a concentration of at least one ounce per gallon.

3. In the preparation of fresh citrus fruit for market, the process of treating such fruit for protection against blue mold and other forms of decay, which comprises applying to the entire surface of fresh citrus fruit a mixed aqueous solution comprising borax and soap in the proportion of from two to four ounces of borax and from one-fourth to one ounce of soap, per gallon.

4. In the preparation of fresh citrus fruit for market, the process as set forth in claim 2, further characterized by the fact that the stated reagents are employed in a mixed solution containing from about two to three ounces of borax per gallon and a smaller quantity of soap, which is applied warm, and the fruit wetted therewith is allowed to dry without rinsing.

5. In the preparation of fresh citrus fruit for market after it has been picked, the process of treating such fruit for protection against blue mold and other forms of decay, which comprises applying to fresh citrus fruit a substance capable of rendering mold spores less water-repellant, in conjunction with an aqueous solution of a mold-retardant of effective strength.

6. In the preparation of fresh fruit for market after it has been picked, the process of treating such fruit for protection against decay-producing organisms which comprises applying to fresh fruit a decay-retarding agent in conjunction with an alkaline agent tending to enhance the permeability of such organisms by said decay-retarding agent.

7. As a new article of manufacture, a composition comprising a mixture of a mold-retardant and an oil-solubilizing agent in finely divided solid condition, the proportion of said oil-solubilizing agent being less than that of said mold-retardant.

8. As a new article of manufacture, a composition comprising a mixture of a mold-retardant and a soap material in finely divided solid condition, the proportion of said soap material being less than that of said mold-retardant.

9. As a new article of manufacture, a composition comprising a mixture of an alkaline borate and a soap material in finely divided solid condition, the proportion of said soap material being less than that of said alkaline borate.

10. As a new article of manufacture, a mixture comprising a boric compound and a soap material in finely divided solid condition, the proportion of said soap material being less than that of said compound.

11. As a new article of manufacture, a mixture comprising borax and a soap material in finely divided solid condition, the soap material constituting a minor proportion of the mixture.

In testimony whereof we hereunto affix our signatures.

ERNEST M. BROGDEN.
MILES L. TROWBRIDGE.